United States Patent
Lee et al.

(10) Patent No.: US 7,524,890 B2
(45) Date of Patent: Apr. 28, 2009

(54) PHOTOCURABLE AND ANTISTATIC RESIN COMPOSITION FOR COATING OPTICAL FIBER

(75) Inventors: Dae Sung Lee, Kunpo-si (KR); Kyoung Beom Min, Ansan-si (KR); Jae Myoung Ryu, Ansan-si (KR); Hae Woog Choi, Bucheon-si (KR); Yong Min Kim, Ansan-si (KR)

(73) Assignee: Luvantix Co., Ltd (KR)

( * ) Notice: Subject to any disclaimer, the term of this patent is extended or adjusted under 35 U.S.C. 154(b) by 469 days.

(21) Appl. No.: 10/568,022

(22) PCT Filed: Aug. 13, 2004

(86) PCT No.: PCT/KR2004/002037

§ 371 (c)(1),
(2), (4) Date: Feb. 10, 2006

(87) PCT Pub. No.: WO2005/017053

PCT Pub. Date: Feb. 24, 2005

(65) Prior Publication Data

US 2008/0161443 A1    Jul. 3, 2008

(30) Foreign Application Priority Data

Aug. 13, 2003    (KR) .................. 10-2003-0056168

(51) Int. Cl.
*C08F 2/46* (2006.01)
*C09D 5/00* (2006.01)
*C09D 175/14* (2006.01)
*C09K 3/16* (2006.01)
*B32B 17/10* (2006.01)

(52) U.S. Cl. .................. 522/75; 522/78; 522/79; 522/83; 522/96; 523/169; 428/378

(58) Field of Classification Search .................. 522/75, 522/81, 96, 78, 79, 83; 523/169; 428/378
See application file for complete search history.

(56) References Cited

U.S. PATENT DOCUMENTS

| | | | | |
|---|---|---|---|---|
| 4,623,594 | A | * | 11/1986 | Keough ................ 428/500 |
| 6,022,620 | A | * | 2/2000 | Wells et al. ............ 428/375 |
| 7,323,232 | B2 | * | 1/2008 | Takeda et al. .......... 428/1.55 |
| 2006/0207644 | A1 | * | 9/2006 | Robinson et al. ........ 136/243 |
| 2008/0118658 | A1 | * | 5/2008 | Kato et al. ............. 427/508 |

FOREIGN PATENT DOCUMENTS

| KR | 2000-21804 | 4/2000 |
|---|---|---|
| KR | 2002-74791 | 10/2002 |

* cited by examiner

*Primary Examiner*—Susan W Berman
(74) *Attorney, Agent, or Firm*—Baker Hostetler, LLP

(57) ABSTRACT

The present invention is directed to a photocurable and antistatic resin composition for coating an optical fiber, comprising (A) a photopolymerizable urethane acrylate oligomer, (B) a reactive monomer having at least one (meth)acrylate or vinyl group, (C) a photoinitiator, and (D) an antistatic agent compatible with the oligomer and monomer components, and optionally (E) a pigment or dye. The coating of the inventive composition can increase the productivity of the optical fiber, and provide an optical fiber having a uniform coating layer.

8 Claims, No Drawings

PHOTOCURABLE AND ANTISTATIC RESIN COMPOSITION FOR COATING OPTICAL FIBER

FIELD OF THE INVENTION

The present invention relates to a photocurable resin composition for coating an optical fiber, having improved antistatic property.

BACKGROUND OF THE INVENTION

An optical fiber has typically a small average diameter of 0.1 to 1 mm and is drawn in the form of a single strand, and therefore, the quality of the optical fiber may be influenced even by a minor change in the electric potential or the tensile strain applied thereto during the producing procedure.

An optical fiber after drawn is continuously subjected to several coating steps with various coating materials such as a primary coating material, a secondary coating material, an ink composition, and a ribbon coating material, for various purposes. Accordingly, studies on the coating of an optical fiber has been mainly made in aspect of an enhancement on the curing speed of the coating composition, and, recently, a photocurable composition has been widely used, rather than a thermally curable composition, due to its high energy-efficiency, short reaction time and simple production equipments.

During the producing procedure, on the other hand, an optical fiber is conveyed at a very high speed, and thus, the surface of the fiber is charged with static electricity by the action of frictional force between the fiber and the conveying apparatus and further the static electricity thus generated accumulates on the surface of the fiber due to the resin component coated on the fiber. That is, the surface of an optical fiber is always in an electrically charged condition all through the producing process.

The static electricity present on the surface of the fiber causes the problems that it generates a repulsive power between the fibers, thus lowering the productivity of the fiber, it makes the fiber to be easily contaminated, and it makes the coated layer to be non-uniform, thus lowering the optical and mechanical properties of the fiber.

To remove the static electricity of an optical fiber, the optical fiber is conventionally passed through an antistatic apparatus installed in the fiber producing system. However, in this method, the static electricity is just temporarily removed, not permanently, and the antistatic apparatus generates a large amount of heat and involves a risk of electric shock.

SUMMARY OF THE INVENTION

It is, therefore, an object of the present invention to provide a way to effectively prevent the accumulation of the static electricity on an optical fiber, thus enhancing the physical properties and productivity of the fiber.

In accordance with one aspect of the present invention, there is provided a photocurable and antistatic resin composition for coating an optical fiber, which comprises (A) a photopolymerizable urethane acrylate oligomer, (B) a reactive monomer having at least one (meth)acrylate or vinyl group, (C) a photoinitiator, and (D) an antistatic agent compatible with the oligomer and the monomer, and optionally (E) a pigment or dye.

DETAILED DESCRIPTION OF THE INVENTION

The photocurable resin composition according to the present invention is characterized by comprising a specified antistatic agent in combination with a specified photopolymerizable urethane acrylate oligomer. The coating of the inventive resin composition can prevent the problems that optical fibers are seceded from production track by the action of antistatic repulsive power even in a production line speed of 1,500 m/min, thus increasing the productivity of the optical fiber. Further, the coating of the inventive resin composition can provide optical fibers with a uniform coating.

The photocurable and antistatic resin composition of the present invention comprises the following components.

(A) Photopolymerizable Urethane Acrylate Oligomer

The photopolymerizable urethane acrylate oligomer used in the composition according to the invention may be synthesized using (i) a polyol copolymer, (ii) a polyisocyanate, (iii) a hydroxy(meth)acrylate, (iv) an urethane reaction catalyst, (v) a polymerization initiator and (vi) other ingredients, and it is preferably employed in the range of 40 to 70 wt % based on the total weight of the composition. If the amount of the photopolymerizable urethane acrylate oligomer is less than 40 wt %, curing shrinkage and poor optical property result, and if it is more than 70% by weight, the viscosity becomes undesirably high.

(i) Polyol Copolymer

A preferable polyol copolymer is a compound having molecular weight ranging from 100 to 10,000 and a repeating unit of —$CH_2CH_2O$— or —$CH_2CH(CH_2CH_3)O$—.

Representative examples of the polyol copolymer used in the preparation of a photopolymerizable urethane acrylate oligomer include polyester polyol, polyether polyol, polycarbonate polyol, polycaprolactone polyol, ring-opened tetrahydrofurane, propylene oxide copolymer and a mixture thereof, preferably, polyester polyol.

In a preferred embodiment, the polyol copolymer may be employed in an amount ranging from 25 to 50 wt % based on the amount of the photopolymerizable urethane acrylate oligomer.

The polyol copolymer may be optionally mixed with a sorbitan fatty acid ester compound such as a sorbitan fatty acid ester or polyoxyethylene sorbitan fatty acid ester, the preferable amount of the sorbitan fatty acid ester being about 1 to 5 wt % based on the total weight of the polyol copolymer. Representative examples of the sorbitan fatty acid ester include sorbitan monolaurate, sorbitan monopalmitate, sorbitan monostearate, sorbitan tristearate, sorbitan monooleate, sorbitan sesquioleate, sorbitan trioleate, and a mixture thereof.

The sorbitan fatty acid ester compound, which is an oily component, may function to smoothen the surface of the coated layer, thus enhancing the antistatic effect.

(ii) Polyisocyanate

A preferable polyisocyanate is selected from the group of consisting of 2,4-tolyenediisocyanate, 2,6-tolyenediisocyanate, 1,3-xylenediisocyanate, 1,4-xylenediisocyanate, 1,5-naphthalenediisocyanate, 1,6-hexanediisocyanate, isophorondiisocyanate and a mixture thereof. In a preferred embodiment, the polyisocyanate is used in an amount ranging from 20 to 40 wt % based on the amount of the photopolymerizable urethane acrylate oligomer.

(iii) Hydroxy(meth)acrylate

The hydroxy(meth)acrylate is a compound comprising at least one (meth)acrylate group and one hydroxy group and preferably selected from the group consisting of 2-hydroxyethyl (meth)acrylate, 2-hydroxypropyl (meth)acrylate, 2-hydroxybutyl (meth)acrylate, 2-hydroxyethyl acrylate, 2-hydroxypropyl acrylate, 2-hydroxy-3-phenyloxypropyl (meth) acrylate, 4-hydroxybutyl acrylate, neopentyl glycomono (meth)acrylate, 4-hydroxycyclohexyl (meth)acrylate, 1,6-hexanediol mono(meth)acrylate, pentaerythritol penta(meth) acrylate, dipentaerythritol penta(meth)acrylate and a mixture thereof. In a preferred embodiment, the hydroxy(meth)acrylate is used in an amount ranging from 20 to 35 wt % based on the amount of the photopolymerriable urethane acrylate oligomer.

(iv) Urethane Reaction Catalyst

The urethane reaction catalyst that catalyze the urethane reaction is preferably selected from the group consisting of copper naphthenate, cobalt naphthenate, zinc naphthenate, n-butyltin laurate, tristhylamine, 2-methyltriethylenediamide and a mixture thereof. In a preferred embodiment, the urethane reaction catalyst is employed in an amount ranging from 0.01 to 1 wt % based on the amount of the photopolymerizable urethane acrylate oligomer.

(v) Polymerization Initiator

The polymerization initiator is preferably selected from the group consisting of hydroquinone, hydroquinonemonomethyl ether, para-benzoquinone, phenothiazin and a mixture thereof. In a preferred embodiment, the polymerization initiator is used in an amount ranging from 0.01 to 1 wt % based on the amount of the photopolymerizable urethane acrylate oligomer.

(vi) Other Ingredients

Other ingredients, e.g., a leveling agent, a dispersant and an antifoaming agent may be added to the photopolymerizable urethane acrylate oligomer composition, and they may be selected from the group consisting of PP1362D, CP1481SF, CP1481F, PE1500F, PEW1555, PE1544F, TF1778, TF1780, TF1830, TFW1765, D2S, E2S, A1601, and HM 1666 (Manufactured by Langer&Co. Ltd.); SYLOID63, SYLOID65, SYLOID66, SYLOID72, SYLOID74, SYLOID79, SYLOID404, SYLOID620, SYLOID308, SYLOID978, SYLOID160, SYLOID161, SYLOID162, SYLOID800, SYLOID810, SYLOID150, SYLOID244, SYLOID266, and SYLOID255 (Manufactured by Grace Co. Ltd.); Irganox 1010, Irganox 1035, and Irganox 1076 (Maunfactured by Ciba geigy Co. Ltd.); HK125, HK400, OK412, OK412LC, OK520, OK607, TS100, and TT600 (Manufactured by Degussa Co. Ltd.); Anti-Terra-203, Anti-Terra-204, Anti-Terra-205, Anti-Terra-206, Anti-Terra-U, Anti-Terra-U80, BYK-151, BYK-154, BYK-220S, BYK-P104, BYK-P104S, BYK-P105, Bykumen, Disperbyk, Disperbyk-101, Disperbyk-103, Disperbyk-107, Disperbyk-108, Disperbyk-110, Disperbyk-111, Disperbyk-115, Disperbyk-116, Disperbyk-130, Disperbyk-140, Disperbyk-160, Disperbyk-161, Disperbyk-162, Disperbyk-163, Disperbyk-164, Disperbyk-166, Disperbyk-167, Disperbyk-169, Disperbyk-170, Disperbyk-171, Disperbyk-174, Disperbyk-180, Disperbyk-181, Disperbyk-182, Disperbyk-183, Disperbyk-184, Disperbyk-185, Disperbyk-190, Lactimon, and Lactiomon-WS (Manufactured by BYK-Chemie Co., Ltd.).

These ingredients are added preferably in an amount of from 0.1 to 5 wt %, more preferably 0.5 to 1 wt % based on the amount of the photopolymerizable urethane acrylate oligomer.

The photopolymerizable urethane acrylate oligomer(A) may be prepared by a conventional method, and a preferred embodiment is as follows: A polyol copolymer, an optional sorbitan ester compound and a polymerization initiator are placed into a polymerization reactor, and water is removed under a reduced pressure. The mixture is heated to 40 to 65° C. for 0.5 to 1 hour, and a polyisocyanate is added to the resulting mixture stepwise with stirring at 200 to 300 rpm, followed by adding one third amount of the catalyst to the mixture. After the ensuing exotherm subsides, the reaction is carried out at a temperature ranging from 50 to 75° C. for about 2 to 3 hours until no —OH peak is observable by IR. Then, a hydroxy(meth)acrylate is added to the mixture. After the ensuing exotherm, the mixture is heated to a temperature in the range of from 60 to 80° C., and, then, the remaining catalyst is added thereto. The reaction is carried out until no —NCO peak is detectable by IR, to obtain a photopolymerizable urethane acrylate oligomer of the present invention.

(B) Reactive Monomer

The reactive monomer, which may be used in the composition of the present invention together with the photopolymerizable urethane acrylate oligomer, has at least one (meth) acrylate or vinyl group, and it is used for the purpose of lowering the viscosity of the macromolecule oligomer.

The reactive monomer suitable for practicing the invention is a photopolymerizable compound that gives a polymer of high tensile strength and low curing shrinkage, and is preferably selected from the group consisting of phenoxyethyl acrylate, phenoxy diethyleneglycol acrylate, phenoxy tetraethyleneglycol acrylate, phenoxy hexaethyleneglycol acrylate, isobornyl acrylate(IBOA), isobornyl methacrylate, N-vinylpyrrolidone(N-VP), bisphenol ethoxylate diacrylate, ethoxylate phenol monoacrylate, polyethylene glycol 200 diacrylate, tripropylene glycol diacrylate, triethylpropane triacrylate(TMPTA), polyethyleneglycol diacrylate, ethyleneoxide added triethylpropanetriacrylate, ethoxy added triethylolpropane triacrylate, pentaerythritol tetraacrylate (PETA), 1,4-butanediol diacrylate, 1,6-hexanediol diacrylate, ethoxylated pentaerythritol tetraacrylate, 2-phenoxyethyl acrylate, ethoxylated bisphenol A diacrylate and a mixture thereof.

In a preferred embodiment, the photopolymerizable reactive monomer may be used in an amount ranging 15 to 50 wt % based on the total weight of the resin composition. If the monomer content is less than 15 wt %, it is difficult to adjust the viscosity down to a workable level in the range of 4000 to 8000 cps (at 25° C.), and if it is more than 50 wt %, unacceptable curing shrinkage of the film results.

(C) Photoinitiator

The photoinitiator used in the composition of the present invention is added in order to maintain rapid curing of the resin since the coating of an optical fiber is performed under a rapid line velocity of at least 1,500 m/min.

Representative examples of the photoinitiator employed in the present invention are Irgacure#184 (hydroxycyclohexyl phenyl ketone), Irgacure#907 (2-methyl-1-[4-(methylthio) phenyl]-2-morpholino-propan-1-one), Irgacure#500, Irgacure#651, Darocure#1173 (2-hydroxy-2-methyl-1-phenyl-propan-1-one), Darocure#116, CGI#1800, CGI#1700 and a mixture thereof. In a preferred embodiment, the initiator may be used in an amount ranging from 0.5 to 10 wt % based on the total weight of the composition. If the content of the initiator is less than 0.5 wt %, hardness and chemical resistance of the composition decrease due to delaying in curing, and if it is more than 10 wt %, the storage stability deteriorates.

(D) Antistatic Agent

The composition of the present invention uniquely comprises an antistatic agent in order to improve the antistatic property of the coating layer on optical fiber. The antistatic agent which may be used in the inventive composition has a good compatibility with an UV curable resin in the coating composition. Representative examples of such an antistatic agent include Morestst ES-1200(non-ionic amine), Morestst ES-1801(non-ionic amine), Morestst ES-1895(fatty acid ester of polyhydric alcohol), Morestst ES-2200(non-ionic amine), Morestst ES-2300(non-ionic amine), Morestst ES-2400(non-ionic amine), Morestst ES-2500(fatty amide), Morestst ES-3000, Morestst ES-3300, and Morestst ES-6000 (cationic mixture and isopropanol), Morestst ES-6500 (hereinbefore, products of Morechem, Korea), Celtex-ASA, Celtex-AS7 (alkyl betain) (hereinbefore, products of Cell chemical, Korea).

In a preferred embodiment, the antistatic agent is used in an amount ranging from 1 to 30% by weight based on the total weight of the coating composition.

(E) Pigment or Dye

The inventive resin composition may comprise a pigment or dye, if necessary. Representative examples thereof include Paliotol Black L0080(aniline), Paliogen Black L0086 (perylene), Paliotol Yellow L0962(quinophthalone), Paliotol Yellow L1772(nickel complex), Paliotol Orange L2930HD (pyrazolo-quinazolone), Paliogen Red L3880HD(perylene), Paliogen Red L4120(perylene), Heliogen Blue L7101F(Cu-phthalocyanine-beta) and Heliogen Green L8731 (Cu-phthalocyanine-chlor) (hereinbefore, products of BASF); Irgalite Yellow G0(arylamide), Cromopthal Red BRN(azo condensation), Irgalite Red FBL, Irgalite Blue GLNF(Cu-phthalocyanine-beta) and Irgazin Blue A3RN(indanthrone) (hereinbefore, products of Ciba Geigy); and Daihan Yellow D525 (diarylide anilide), Daihan Yellow D581(diarylide dimethoxy chloroanilide), Daihan Orange D513(diarylide pyrazolone), Daihan Red C140, Daihan Red 2B235(azo compounds), Daihan Blue 3700(Cu-phthalocyanine-alpha), Daihan Blue 8700(Cu-phthalocyanine-beta) (hereinbefore, products of Daihan Swiss Chemicals, Korea).

The pigment may be employed in an amount of 1 to 10% by weight of the coating composition.

(F) Other Additives

The inventive coating composition may comprise other additives such as a leveling agent, a dispersant, a slip agent, an antifoaming agent, and an antioxidant, which may be conventionally used in the preparation of the photopolymerizable urethane acrylate oligomer.

In a preferred embodiment, they are used in an amount ranging from 0.1 to 5% based on the total weight of the composition. In particular, representative examples of the antioxidant are Irganox 1010, Irganox 1035, Irganox 1076 (Manufactured by Ciba Geigy Co. Ltd.) and a mixture thereof. In a preferred embodiment, the antioxidant may be employed in an amount ranging from 0.1 to 5 wt % based on the total weight of the composition.

Compounding of the Components

The inventive photocurable resin composition may be prepared by a conventional method. A preferred embodiment of the process is as follows: a mixture of the components (A) to (F) is added to a polymerization reactor at a temperature ranging from 15 to 50° C. under a relative humidity of 60% or below and stirred at a rate of at least 1,000 rpm, to prepare a photocurable resin composition. If the temperature is less than 15° C., processing difficulties arise because the viscosity of the oligomer(A) becomes too high, and if the temperature is higher than 50° C., the reaction product undergoes crosslinking. Further, the humidity is higher than 60%, the coating of the resin composition may comprise bubbles, and the not-reacted ingredient may be reacted with water to occur by-reaction.

The present invention is further described and illustrated in Examples provided below, which are, however, not intended to limit the scope of the present invention.

Preparation of Urethane Acrylate Oligomers

Preparation 1

885.5 g of polytetramethylene glycol (diol type, M.W.:1,000) (a product of BASF Corporation), 48.8 g of methylpropanediol (M.W.:90) (a product of Aldrich) and 634.5 g of isophorone diisocyanate (IPDI) (a product of Lyondell Chemical Company) were placed in a 2 L flask. The resulting mixture was heated to 40 to 50° C. and, then, 1 g of n-butyltin laurate (DBTL) (a product of Songwon Industries, Korea) was added thereto. After the initial exothermic stage, the mixture was kept at a temperature of 50 to 70° C. until no —OH peak was observable by IR. Then, 2.25 g of hydroquinone monomethyl ether (HQMME) (a product of Eastman) and 427 g of 2-hydroxypropyl acrylate (2-HPA) (a product of Nippon Shokubai) were added to the mixture. After the ensuing exotherm subsided, the mixture was kept at 60 to 75° C. until no —NCO peak was detectable by IR, and 2 g of DBTL was added to the resulting mixture, to obtain a photopolymerizable urethane acrylate oligomer.

Preparation 2

860.5 g of polytetramethylene glycol (diol type, M.W.:1,000), 57.2 g of methylpropanediol (M.W.:90) and 674.5 g of 2,4-toluene diisocyanate (TDI) were placed in a 2 L flask. The resulting mixture was heated to 40 to 50° C. and, then, 1 g of n-butyltin laurate (DBTL) was added thereto. After the initial exothermic stage, the mixture was kept at a temperature of 50 to 70° C. until no —OH peak was observable by IR. Then, 2.15 g of hydroquinone monomethyl ether (HQMME) and 450 g of 2-hydroxypropyl acrylate (2-HPA) were added to the mixture. After the ensuing exotherm subsided, the mixture was kept at 60 to 75° C. until no —NCO peak was detectable by IR, and 2 g of DBTL was added to the resulting mixture, to obtain a photopolymerizable urethane acrylate oligomer.

Preparation 3

855.5 g of polytetramethylene glycol (diol type, M.W.:1,000), 43.3 g of methylpropanediol (M.W.:90), 15.5 g of sorbitan monolaurate (M.W.:346.5) and 630.5 g of 1,5-naphthalene diisocyanate were placed in a 2 L flask. The resulting mixture was heated to 40 to 50° C. and, then, 1 g of n-butyltin laurate (DBTL) was added thereto. After the initial exothermic stage, the mixture was kept at a temperature of 50 to 70° C. until no —OH peak was observable by IR. Then, 2.25 g of hydroquinone monomethyl ether (HQMME) and 427 g of 2-hydroxypropyl acrylate (2-HPA) were added to the mixture. After the ensuing exotherm subsided, the mixture was kept at 60 to 75° C. until no —NCO peak was detectable by IR, and 2 g of DBTL was added to the resulting mixture, to obtain a photopolymerizable urethane acrylate oligomer.

Preparation of Antistatic Resin Composition for Coating Optical Fibers

The ingredients (A) to (E) described in Table 2 were added to a reactor with stirring at a rate of 1,000 rpm at about 25° C. under a relative humidity ranging from 30 to 60%, to obtain various photocurable resin compositions.

TABLE 1

| | Example | | | | | | | | | | | | | | | | | | Comp. Example | | | |
|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 1 | 2 | 3 | 4 |
| (A) Olygomer | | | | | | | | | | | | | | | | | | | | | | |
| Prep. 1 | 57 | 57 | | | | | 57 | 57 | 57 | 57 | 57 | 57 | | | | | | | 60 | 60 | | |
| Prep. 2 | | | 57 | 57 | | | | | | | | | 57 | 57 | 57 | 57 | 57 | 57 | | | 60 | 60 |
| Prep. 3 | | | | | 57 | 57 | | | | | | | | | | | | | | | | |
| (B) Reactive monomer | | | | | | | | | | | | | | | | | | | | | | |
| monomer 1 | 10 | 10 | 10 | 10 | 10 | 10 | 10 | 10 | 10 | 10 | 10 | 10 | | | | | | | 12 | 12 | 12 | 12 |
| monomer 2 | 15 | 15 | 15 | 15 | 15 | 15 | 15 | 15 | 15 | 15 | 15 | 15 | 24 | 24 | 20 | 20 | 15 | 15 | 20 | 20 | 20 | 20 |
| monomer 3 | | 2 | | 2 | | 2 | | 2 | | 2 | | 2 | 1 | | 5 | | 10 | | | 2 | | 2 |
| (C) Photoinitiator | | | | | | | | | | | | | | | | | | | | | | |
| Darocure#1173 | 3 | 3 | 3 | 3 | 3 | 3 | 3 | 3 | 3 | 3 | 3 | 3 | 3 | 3 | 3 | 3 | 3 | 3 | 3 | 3 | 3 | 3 |
| CGI 1800 | 3 | 3 | 3 | 3 | 3 | 3 | 3 | 3 | 3 | 3 | 3 | 3 | 3 | 3 | 3 | 3 | 3 | 3 | 3 | 3 | 3 | 3 |
| (D) Antistatic agent | | | | | | | | | | | | | | | | | | | | | | |
| Morestst ES-1200 | 5 | 5 | 5 | 5 | 5 | 5 | 5 | 5 | 5 | 5 | 5 | 5 | 5 | 5 | 5 | 5 | 5 | 5 | | | | |
| Morestst ES-2200 | 5 | 5 | 5 | 5 | 5 | 5 | | | | | | | | | | | | | | | | |
| Morestst ES-3000 | | | | | | | 5 | 5 | | | | | 5 | 5 | 5 | 5 | 5 | 5 | | | | |
| Morestst ES-6000 | | | | | | | | | 5 | 5 | | | | | | | | | | | | |
| Celtex-ASA | | | | | | | | | | | 5 | 5 | | | | | | | | | | |
| (E) Pigment | | | | | | | | | | | | | | | | | | | | | | |
| Palitol Black L0080 | 2 | | 2 | | 2 | | 2 | | 2 | | 2 | | 2 | | 2 | | 2 | | 2 | | 2 | |

*monomer 1: isobornyl acrylate(Aldrich), monomer 2: triethylpropane triacrylate(Aldrich), monomer 3: ethoxylated nonylphenol acrylate(Sartomer)

Antistatic Characteristics

The antistatic properties of the resin compositions prepared in Examples 1-18 and Comparative Examples 1-4 were evaluated as follows.

Each of the resin composition was coated on a 50×25 cm glass plate and photo-cured with a 1.0 J/cm D Lamp to form a film having a thickness of 20±5 μm. The antistatic property of the resulting film was evaluated by measuring the surface resistance of the film with an mOhm Hi 3220 Tester (a product of HIOKI, Japan) and SM-8206 Super Mega Ohm Tester (a product of TOA, Japan) in a clean room ($10^5$ class) at a condition of a humidity of 50±1% and a temperature of 25±1° C. As the higher the surface resistance value of the film is, the antistatic characteristic of the film is inferior. It is generally preferred that the surface resistance of an optical fiber is maintained at below $1\times10^{12}$ Ω/square so as to prevent the accumulation of static electricity on the surface of the coated layer of the optical fiber.

TABLE 2

| | | Surface Resistance (Ω/square) |
|---|---|---|
| Example | 1 | $1 \times 10^{11}$ |
| | 2 | $2 \times 10^{11}$ |
| | 3 | $1 \times 10^{11}$ |
| | 4 | $5 \times 10^{10}$ |
| | 5 | $1 \times 10^{10}$ |
| | 6 | $5 \times 10^{10}$ |
| | 7 | $6 \times 10^{10}$ |
| | 8 | $7 \times 10^{10}$ |
| | 9 | $5 \times 10^{10}$ |
| | 10 | $1 \times 10^{11}$ |
| | 11 | $2 \times 10^{11}$ |
| | 12 | $5 \times 10^{11}$ |
| | 13 | $3 \times 10^{11}$ |
| | 14 | $5 \times 10^{11}$ |
| | 15 | $1 \times 10^{11}$ |
| | 16 | $2 \times 10^{11}$ |
| | 17 | $2 \times 10^{11}$ |
| | 18 | $1 \times 10^{11}$ |
| | 19 | $1 \times 10^{11}$ |
| Comparative Example | 1 | $2 \times 10^{14}$ |
| | 2 | $5 \times 10^{13}$ |
| | 3 | $2 \times 10^{14}$ |
| | 4 | $2 \times 10^{14}$ |

As shown in Table 2, the photocurable resin compositions according to the Examples of the present invention can impart excellent antistatic characteristics to an optical fiber, while the resin compositions according to the comparative Examples no containing an antistatic agent have poor antistatic properties.

While the subject invention have been described and illustrated with respect to the preferred embodiments only, various changes and modifications may be made therein without departing from the essential concept of the present invention which should be limited only by the scope of the appended claims.

What is claimed is:

1. A photocurable and antistatic resin composition for coating an optical fiber, comprising (A) a photopolymerizable urethane oligomer, (B) a reactive monomer having at least one (meth)acrylate or vinyl group, (C) a photoinitiator, and (D) an antistatic agent compatible with the oligomer and the monomer, wherein the photopolymerizable urethane acrylate oligomer (A) is derived from an urethane reaction of a mixture comprising (i) a polyol copolymer mixed with a sorbitan fatty acid ester or polyoxyethylene sorbitan fatty acid ester, (ii) a polyisocyanate, (iii) a hydroxyl(meth)acrylate, (iv) an urethane reaction catalyst and (v) a polymerization initiator.

2. The resin composition of claim 1, wherein the components (A) to (D) are employed in amounts of 40 to 70% by weight, 15 to 50% by weight, 0.5 to 10% by weight, and 1 to 30% by weight, respectively, based on the total weight of the composition.

3. The resin composition of claim 1, which further comprises (E) a pigment or dye.

4. The resin composition of claim 2, which further comprises (E) a pigment or dye.

5. The resin composition of claim 1, wherein the components (i) to (v) are employed in amounts of 25 to 50% by weight, 20 to 40% by weight, 20 to 35% by weight, 001 to 1% by weight, and 0.01 to 1% by weight, respectively, based on the mixture for the urethane reaction.

6. The resin composition of claim 1, wherein the sorbitan fatty acid ester is selected from the group consisting of sorbitan monolaurate, sorbitan monopalmitate, sorbitan monostearate, sorbitan tristearate, sorbitan monooleate, sorbitan sesquioleate, sorbitan trioleate, and a mixture thereof.

7. The resin composition of claim 1, wherein the sorbitan fatty acid ester is employed in an amount of 1 to 5% by weight of the polyol polymer.

8. The resin composition of claim 1, wherein the antistatic agent is selected from the group consisting of a non-ionic or cationic amine, polyhydric alcohol fatty acid ester, a fatty amide, an alkyl betain and a mixture thereof.

* * * * *